(12) United States Patent
Lee (10) Patent No.: US 6,519,001 B1
(45) Date of Patent: Feb. 11, 2003

(54) COLOR SIGNAL SEPARATING CIRCUIT PURE COLOR SIGNALS

(75) Inventor: Cheol-kyoo Lee, Seoul (KR)

(73) Assignee: Samsung Electronics Co., Ltd., Hwasung (KR)

(*) Notice: Subject to any disclaimer, the term of this patent is extended or adjusted under 35 U.S.C. 154(b) by 0 days.

(21) Appl. No.: 08/957,348

(22) Filed: Oct. 24, 1997

(30) Foreign Application Priority Data

Oct. 24, 1996 (KR) .............................. 96-48143

(51) Int. Cl.[7] ................................. H04N 9/73
(52) U.S. Cl. .................................... 348/223.1
(58) Field of Search ............................ 348/223, 225, 348/226, 227, 312, 266, 272, 273, 277, 280, 228, 224, 655, 656, 278, 279, 207, 223.1, 225.1, 227.1; 358/515, 516, 517, 518

(56) References Cited

U.S. PATENT DOCUMENTS

| | | | | |
|---|---|---|---|---|
| 4,998,162 A | * | 3/1991 | Kondo et al. | 348/228 |
| 5,253,047 A | * | 10/1993 | Machishima | 348/224 |
| 5,508,742 A | * | 4/1996 | Geerlings et al. | 348/279 |
| 5,550,587 A | * | 8/1996 | Miyadera | 348/223 |
| 5,648,818 A | * | 7/1997 | Fukatsu | 348/223 |
| 5,726,707 A | * | 3/1998 | Sakurai et al. | 348/279 |
| 5,999,215 A | * | 12/1999 | Tamura | 348/345 |
| 6,204,878 B1 | * | 3/2001 | Hieda | 348/220 |

* cited by examiner

Primary Examiner—Aung S. Moe
(74) Attorney, Agent, or Firm—Marger Johnson & McCollom, P.C.

(57) ABSTRACT

A color signal separating circuit includes a new color signal separating algorithm for improving color quality. The color signal separating circuit includes a CCD output synchronizing block for synchronizing first and second data input signals received from a CCD in response to first and second basic clock signals, first and second sampling clock signals, and a line selecting signal, and generating first through fifth output signals. The color signal separating circuit further includes a color signal generating block for receiving the first through fifth output signals from the CCD output synchronizing block in response to the first and second basic clock signals, and generating red, green, and blue color signals. The color signal separating circuit also includes a pre-white balance controlling block for receiving the red and blue color signals and first and second coefficient inputs in response to the first and second basic clock signals, and third and fourth basic clock signals, controlling the gains of the red and blue color signals, and generating a final output signal.

11 Claims, 9 Drawing Sheets

COLOR SIGNAL SEPARATING CIRCUIT PURE COLOR SIGNALS

BACKGROUND OF THE INVENTION

1. Field of the Invention

The present invention is useful in color signal processing. It consists of a color signal separating circuit using a color signal separating algorithm.

2. Description of the Related Art

A digital signal processing camera using a CCD area image sensor (hereinafter referred to as a CCD) converts an image signal composed of light into an electrical signal representing the original image. It then performs predetermined signal processing on the electrical signal. Next, it saves the processed signal in a storage medium such as an analog video tape recorder or digital video tape recorder so that the electrical signal can be reproduced when necessary. There are two kinds of CCDs: one is for black-and-white signal processing, and the other is for color signal processing. Based on the CCD they contain, cameras are divided into groups of black-and-white or color, and each type employs different basic signal processing methods. Black-and-white signal processing is simple since photoelectric conversion requires only one characteristic, the brightness of an image. On the other hand, color signal processing requires luminance signals representing the brightness of an image as well as color signals to keep track of colors.

The present invention is confined to color signal processing. To convert a two-dimensional light image signal into a color signal, there are two methods. First, one can install three primary color filters (red, blue, and green) into a CCD and convert the light image into an electrical signal. Second, one can install a prism, obtain three primary red, blue, and green colors, and then convert each resulting light image into electrical signals. In the latter, color separation is excellent, although the size of a camera is increased due to the need for a prism and three black-and-white CCDs. On the other hand, the former has disadvantages in that it is difficult to build due to the increase of CCD pixels. It also suffers from poor color reproduction quality due to uniformless red, blue, and green filter characteristics. However, it has the advantage of creating small cameras. To get the best of both methods, single CCD cameras have been widely used recently. They process a image signal with a single CCD, then use a complementary color filter exhibiting excellent filter characteristics.

A conventional color signal separating technology using a complementary color filter will be described referring to FIGS. 1 and 2.

Figure 1:
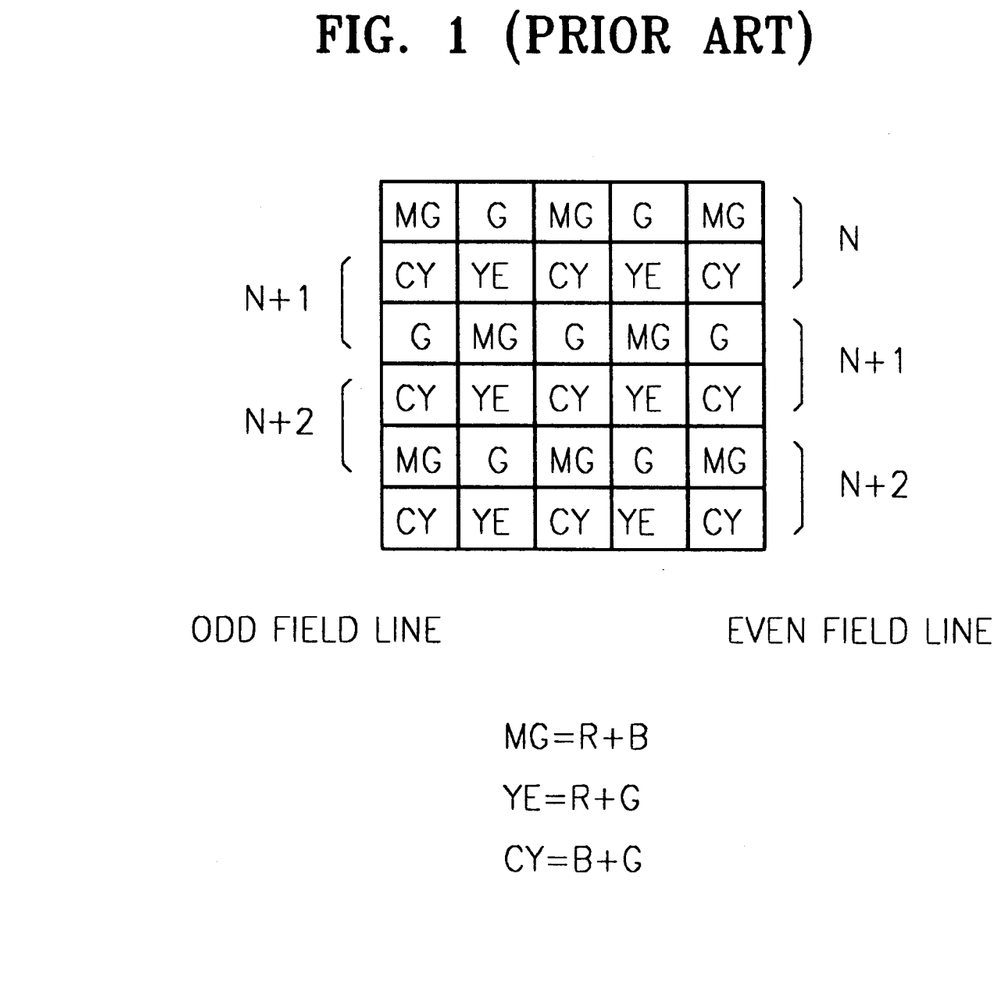
FIG. 1 illustrates a CCD color filter array.

FIG. 1 illustrates a CCD complementary color filter array.

Referring to FIG. 1, the complementary color filter array includes magenta (MG) composed of red (R) and blue (B) signal components; yellow (YE) composed of red and green (G) color signal components; cyan (CY) composed of blue and green signal components; and a green signal G. Signals read from the complementary color filter array of FIG. 1 are divided into even fields and odd fields.

Figure 2:
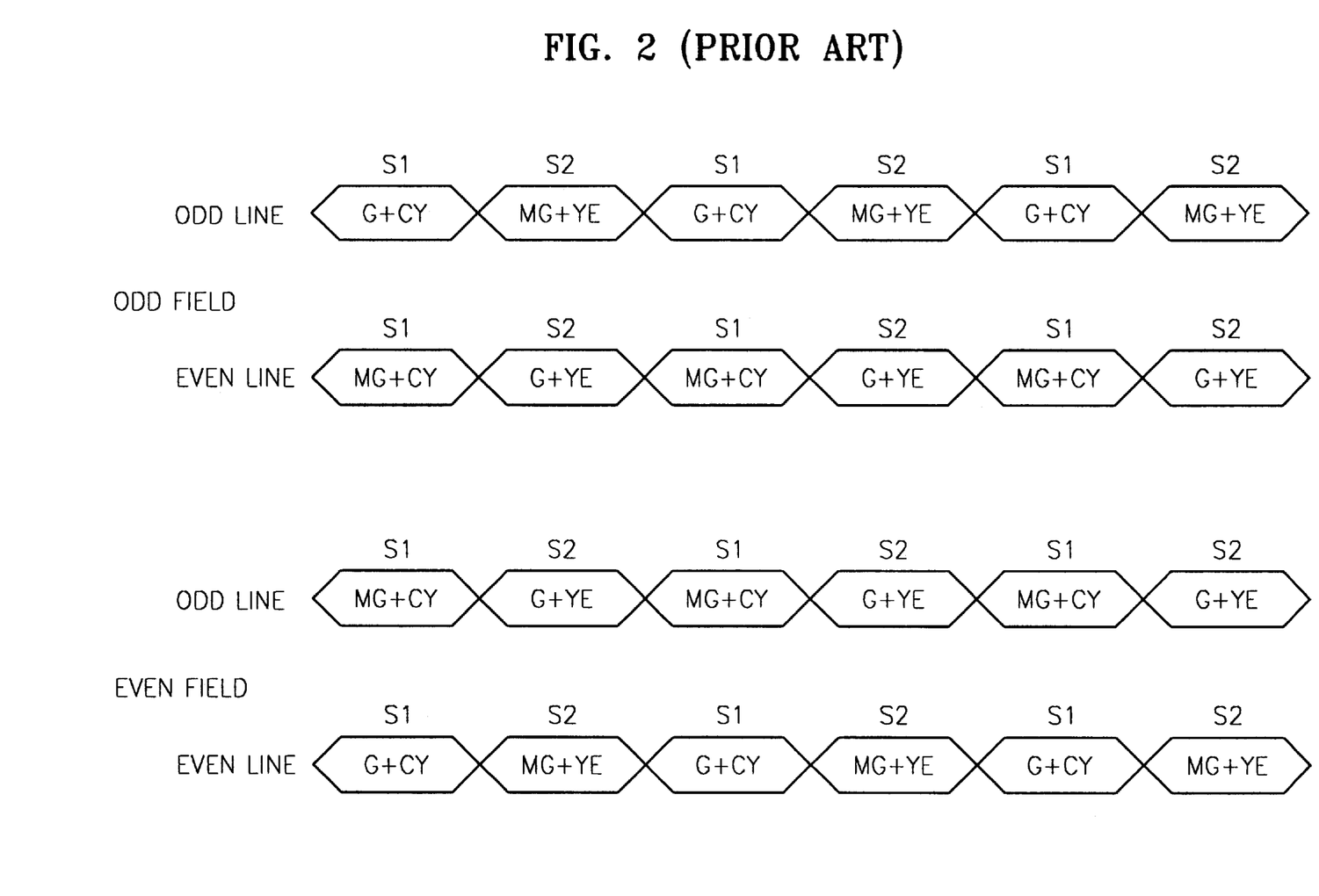
FIG. 2 is a timing diagram of output signals of a CCD having the color filter array shown in FIG. 1.

FIG. 2 is a timing diagram of output signals of a CCD having the complementary color filter array shown in FIG. 1.

Referring to FIG. 2, S2(=MG+YE) and S1(=G+CY) are sequentially output from an odd line of an odd field, while S2(=G+YE) and S1(=MG+CY) are sequentially output from an even line of the odd field. In addition, S2(=G+YE) and S1(=MG+CY) are sequentially output from an odd line of an even field, and S2(MG+YE) and S1(G+CY) are sequentially output from an even line of the even field. To reiterate, in the even field a signal component stored in each pixel is output as synthesized MG+YE and G+CY in the even line, and as synthesized G+YE and MG+CY in the odd line, by the complementary color filter defined by a field interlace method. Symmetrically, in the odd field the signal is output as synthesized G+YE and MG+CY in the even line, and as synthesized MG+YE and G+CY in the odd line. This is a formal format regulated in a CCD structure, and defines an interlace signal processing method. The signals generated above are the fundamental inputs to the color signal processing algorithm of a color camera.

In conventional color signal separating technology, the above four signals are separated into pseudo color signals and luminance signals by the following algorithm.

$$
\begin{aligned}
\text{Even field, odd line: } S2 - S1 &= (G + YE) - (MG + CY) \\
&= G + R + G - R - B - G - B \\
&= G - 2B \\
&= -(2B - G) \\
&= CCB \\
\text{Even field, even line: } S2 - S1 &= (MG + YE) - (G + CY) \\
&= R + B + R + G - B - G - G \\
&= 2R - G \\
&= CCR \\
S2 + S1 &= [(G + YE) + (MG + CY)] \text{ or} \\
&\quad [(MG + YE) + (G + CY)] \\
&= (R + G + B + G + G + R + G) \text{ or} \\
&\quad (R + G + B + G + G + R + G) \\
&= 2R + 3G + 2B \\
&= YL
\end{aligned}
$$

Though not shown here, CCR and CCB outputs are opposite in an odd field. Necessary red, blue, and green signal components are separated using pseudo color signals CCB & CCR and a pseudo luminance signal YL obtained by the above algorithm. An algorithm for this color separation is given as follows.

$$
\begin{aligned}
Red &= CCR + 0.12YL \\
&= 2R - G + 0.12(2R + 3G + 2B) \\
&= 2R - G + 0.24R + 0.36G + 0.24B \\
Green &= YL - CR(CR = CCR - CCB, \text{ here}) \\
&= 2R + 3G + 2B - [(2R - G) + (2B - G)] \\
&= 5G \\
Blue &= -CCB + 0.2G \\
&= 2B - G + 0.2_H 5G \\
&= 2B
\end{aligned}
$$

A second color separation algorithm is also commonly used for camera signal processing. This algorithm, though using a complementary color filter and the same basic signals output from a CCD, employs a different signal processing method and thus further improves the color quality the electrical image signal relative to the previous algorithm.

MG=R+B
YE=R+G
CY=G+B
G=G
C1=MG+YE=2R+B+G
C2=G+CY=2G+B
C3=MG+CY=2B+R+G
C4=G+YE=2G+R $$Red = C1 - SR_HC2 = 2R + B + G - 0.5(2G + B)$$
$$= 2R + 0.5B$$
$$Blue = C3 - SB_HC4 = 2B + R + G - 0.5(2G + R)$$
$$= 2B + 0.5R$$
$$Green = (C2 + C4) - SG(C1 + C3)$$
$$= 2G + B + 2G + R - 0.33(2R + B + G + 2B + G)$$
$$= 4G + B + R - 0.33(3R + 3B + 2G)$$
$$= 4G - 0.66G + 0.01B + 0.01R$$
$$= 3.34G + 0.01B + 0.01R$$

The above algorithm is advantageous in that color quality is improved, when compared to the first algorithm, by intersectionally operating on adjacent signal components. Unfortunately, in the above two algorithms other components are included in the basic signals red, blue, and green. These cause the phase of a color to vary during formation of three important signals generated in subsequent stages: color difference, white balance, and hue control. The net result of this is unintended colors. Moreover, in the above conventional algorithms, differences made between luminance signals by the filter causes the incorrect reproduction of red and blue signals. Finally, due to the prior mentioned luminance signal difference, the level of a green color signal varies as the basis for generating red, green, and blue color signals at every line. This decreases the color quality of green.

SUMMARY OF THE INVENTION

Digital cameras use CCD image sensors to transform images from light waves into electrical signals. There are two types of CCD sensors, those designed for black-and-white imaging and those designed for color. Black-and-white are very simple, as they must only determine the brightness of the elements of an image, while color detection is much more complicated as the CCD must detect both the brightness (luminance) of the elements as well as the colors.

In today's cameras, a single CCD using a complementary color filter does this processing. The filter works via an array of four colors, magenta, yellow, cyan, and green. The array is broken up into even and odd fields, each of which has an odd and even line. Values of each pixel are clocked out sequentially, each pixel being represented by a synthesized MG+YE and G+CY in the even line of the even field, and a synthesized G+YE and MG+CY in the odd line of the even field. The same process (with swapped color codes according to FIG. 1) happens in the odd fields. These values are then processed by a color signal separating circuit, and the background of the invention describes two methods for determining the luminance and color from these sampled pixel values in the prior art.

This invention is the derivation and implementation of a new method for performing this color separation. This method has several advantages over the prior art. These include a lack of other RGB signal components in each basic color; a reduction in the difference between luminance signal; and improved color quality of adjacent (odd and even) lines due to using a stable green signal to obtain the red and blue signals. The circuit designed to implement this consists of a CCD Output Synchronizing Block, a Color Signal Generating Block, and a Pre-White Balance Controlling Block.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Prior to description of the drawings, the color signal separating algorithm of the present invention is described as follows:

MG=R+B
YE=R+G
CY=B+G
G=G
S1=G+CY=2G+B
S2=MG+YE=2R+B+G
S3=MG+CY=2B+R+G
S4=G+YE=2G+R $$YL = 0.5_H \text{odd number } (S1 + S2) + 0.5_H \text{ even number } (S1 + S2)$$
$$= 2R + 3G + 2B$$
$$Green = (S1 + S4) - YL$$
$$= 2(4G + B + R) - (2R + 3G + 2B)$$

-continued $$= 8G + 2B + 2R - 2R - 3G - 2B$$

$$= 5G$$

$$= 5G_H 0.6$$

$$= 3G$$

$$Red = (S2 + S4) - 3G + (S4 - S1)$$

$$= 3R + 3G + B - 3G + R - B$$

$$= 4R$$

$$Blue = (S1 + S3) - 3G + (S4 - S1)$$

$$= 3B + 3G + R - 3G - (R - B)$$

$$= 4B$$

In the color signal separating algorithm of the present invention, the red, green, and blue output signals are free of other signal components, in marked contrast to conventional color signal separating algorithms. In addition, performing operations using signals of adjacent as well as non-adjacent pixels during generation of the color signal narrows the difference between luminance signals generated due to filter characteristics. Furthermore, a stable green signal is obtained by operating on the signals of adjacent as well as non-adjacent pixels, and red and blue signals are obtained on the basis of this stabilized green signal. Thus, the color quality of two adjacent lines (odd and even) formed by eight pixels is remarkably improved.

Figure 3:
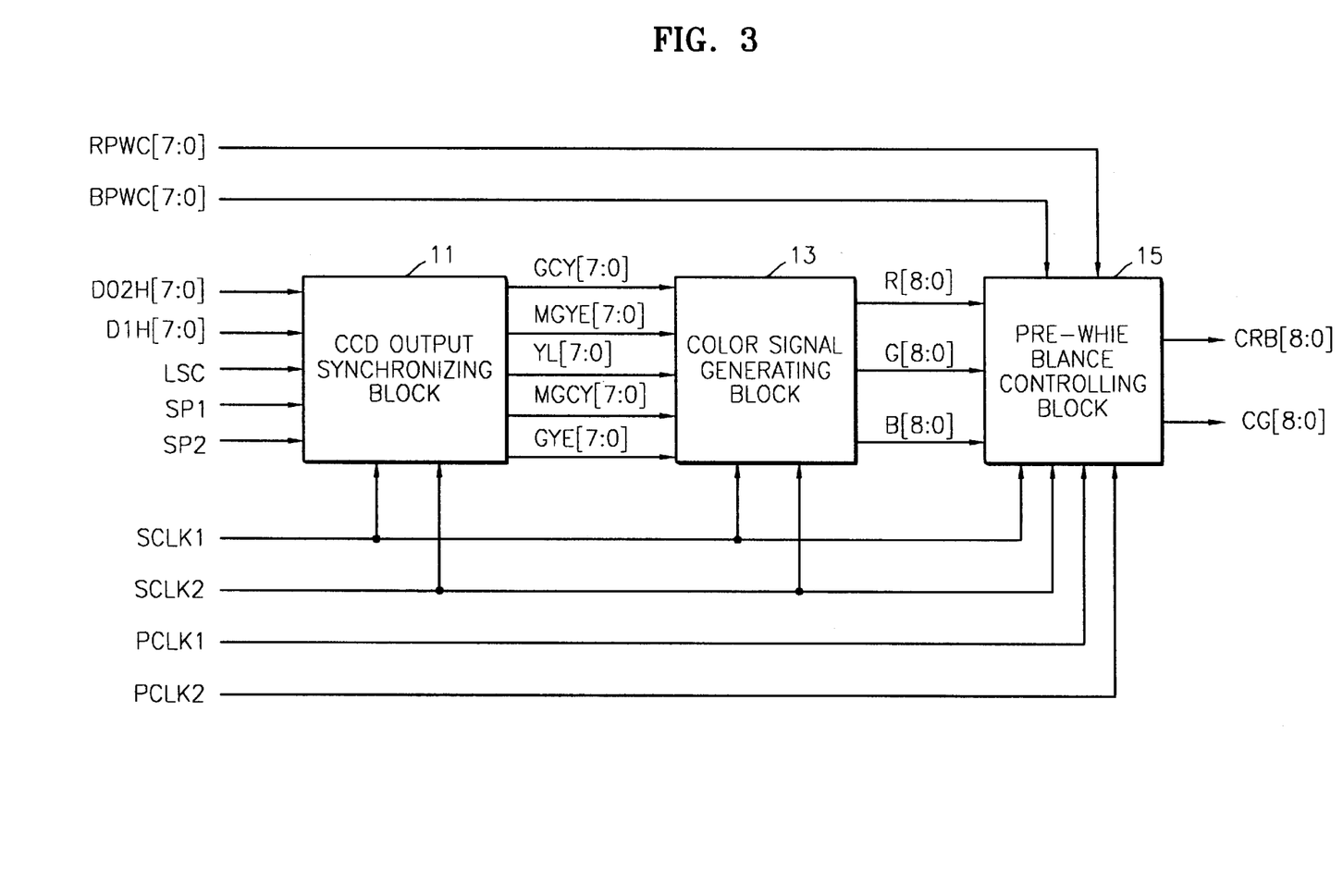
FIG. 3 is a block diagram of a color signal separating circuit according to the present invention.

FIG. 3 is a block diagram of a color signal separating circuit implemented in hardware from the above-described color signal separating algorithm of the present invention.

Referring to FIG. 3, the color signal separating circuit includes a CCD output synchronizing block 11, a color signal generating block 13, and a pre-white balance controlling block 15.

The operation of each block will be described. The CCD output synchronizing block 11 synchronizes first and second data input signals D02H[7:0] and D1H[7:0] received from a CCD in response to first and second basic clock signals SCLK1 and SCLK2, first and second sampling clock signals SP1 and SP2, and a line selecting signal LSC. The block then generates five output signals: GCY[7:0], a mixture of green and cyan; MGYE[7:0], a mixture of magenta and yellow; YL[7:0], a luminance signal for eight basic pixels; MGCY[7:0], a mixture of magenta and cyan; and GYE[7:0], a mixture of green and yellow. The frequency of the first through fifth output signals is half that of the CCD output signal.

The color signal generating block 13 receives the five synchronized signals output signals GCY[7:0], MGYE[7:0], YL[7:0], MGCY[7:0], and GYE[7:0] in response to the first and second basic clock signals SCLK1 and SCLK2. It then generates red, green, and blue signals R[8:0], G[8:0], and B[8:0] according to the color separating algorithm of the present invention.

The pre-white balance controlling block 15 receives the red, green, and blue signals R[8:0], G[8:0], and B[8:0] and first and second coefficient inputs RPWC[7:0] and BPWC[7:0] in response to the first and second basic clock signals SCLK1 and SCLK2, and third and fourth basic clock signals PCLK1 and PCLK2. It then generates signals CRB[8:0] and CG[8:0] of the same level needed in a matrix processing portion (not shown) at the next stage.

In the preferred embodiment of the invention, the first data input signal D1H[7:0] is a signal passed through a single unit delay. The size of the second data input signal D02H[7:0] is adjusted to have half the size of the sum of a signal avoiding the single unit delay and a signal passed through two unit delays. The line selecting signal LSC serves to constantly keep the sequence of data input signals for each line of odd and even fields. The first and second sampling clock signals SP1 and SP2 are needed to perform sampling to convert each pixel component into a frequency necessary for signal processing. The first and second basic clock signals SCLK1 and SCLK2 have a period twice larger than that of the third and fourth basic clock signals PCLK1 and PCLK2. The first coefficient input RPWC[7:0] is a gain value of the pre-white balance for the red signal R[8:0], and the second coefficient input BPWC[7:0] is a gain value of the pre-white balance for the blue signal B[7:0].

Figure 4:
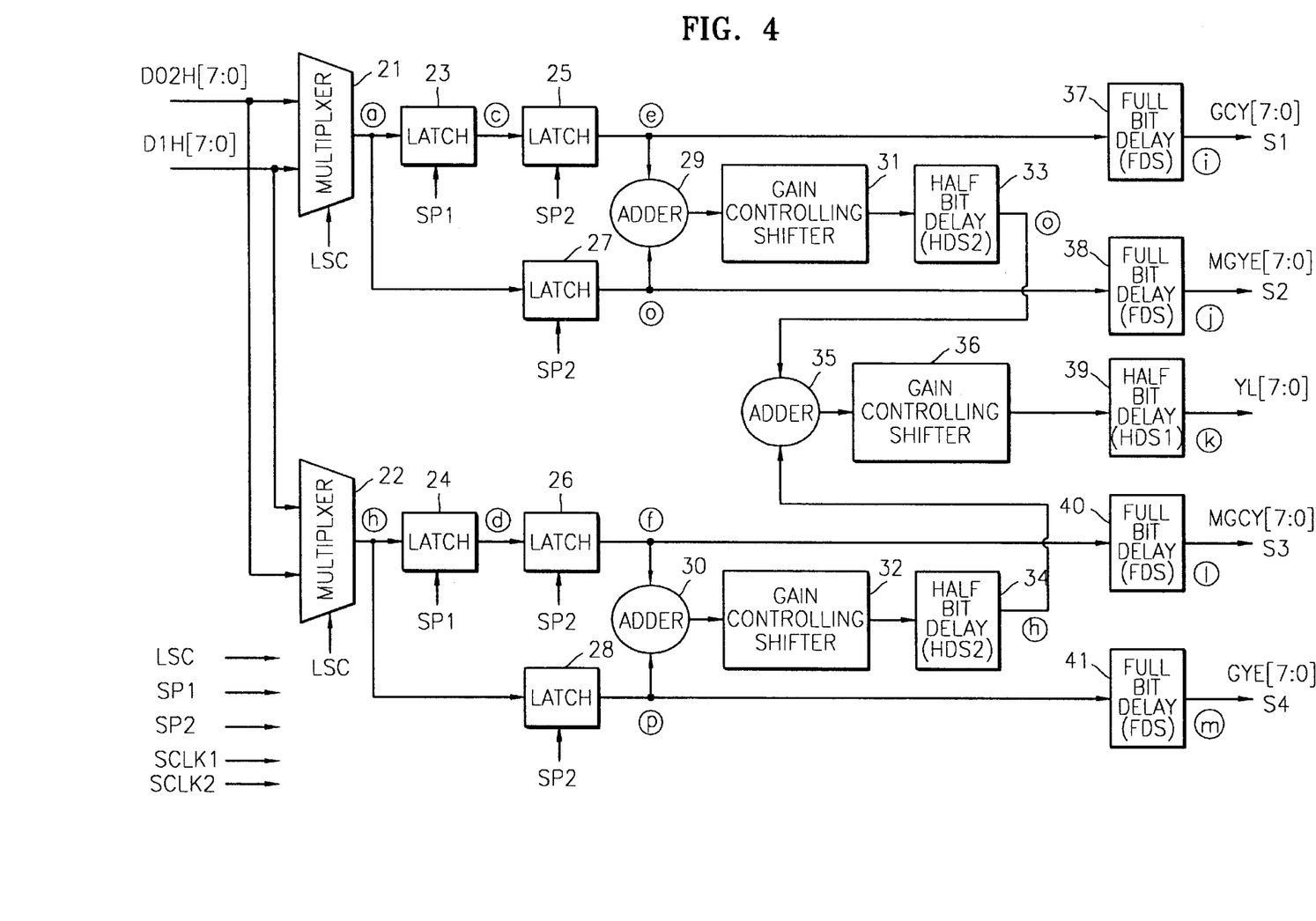
FIG. 4 is a detailed block diagram of the CCD output synchronizing block in the color signal separating circuit of FIG. 3.

FIG. 4 is a detailed block diagram of the CCD output synchronizing block in the color signal separating circuit shown in FIG. 3.

Referring to FIG. 4, the CCD output synchronizing block includes first and second multiplexers 21 and 22, first through sixth sampling latches 23–28, first through third adders 29, 30, and 35, first through third gain controlling shifters 31, 32, and 36, first and second half bit delays (HDS2) 33 and 34, a third half bit delay (HDS1) 39, and first through fourth full bit delays 37, 38, 40, and 41.

The first and second multiplexers 21 and 22 each select one of the first and second data input signals D1H[7:0] and D02H[7:0] in response to the line selecting signal LSC. This keeps a predetermined sequence of the first and second input signals D1H[7:0] and D02H[7:0], which are data signals received from a CCD for each line. The first and second sampling latches 23 and 24 latch the outputs of the first and second multiplexers 21 and 22, respectively, in response to the first sampling clock signal SP1. The third and fourth sampling latches 25 and 26 latch the outputs of the first and second sampling latches 23 and 24, respectively, in response to the second sampling clock signal SP2. The fifth and sixth sampling latches 27 and 28 latch the outputs of the first and second multiplexers 21 and 22, respectively, in response to the second sampling clock signal SP2. The first and second adders 29 and 30 add the outputs of the third and fifth sampling latches 25 and 27, and the outputs of the fourth and sixth sampling latches 26 and 28, respectively, to obtain an averaged luminance signal for CCD pixels. The first and second gain controlling shifters 31 and 32 cut the level of the output signals of the first and second adders 29 and 30 in half. The first and second half bit delays (HDS2) 33 and 34 synchronize the outputs of the first and second gain controlling shifters 31 and 32 with a negative edge of the second basic clock signal SCLK2. The third adder 35 adds the outputs of the first and second half bit delays 33 and 34 to obtain an average luminance value of pixels. The third gain controlling shifter 36 halves the level of the output signal of the third adder 35. The third half bit delay (HDS1) 39 synchronizes the output of the third gain controlling shifter 36 with the negative edge of the first basic clock signal SCLK1. This generates the third output signal YL[7:0]. The first through fourth full bit delays (FDS) 37, 38, 40, and 41 synchronize the outputs of the third through sixth sampling latches 25–28 with the first and second basic clock signals SLCK1 and SLCK2. This generates first, second, fourth, and fifth output signals GCY[7:0], MGYE[7:0], MGCY[7:0], and GYE[7:0].

Figure 5:
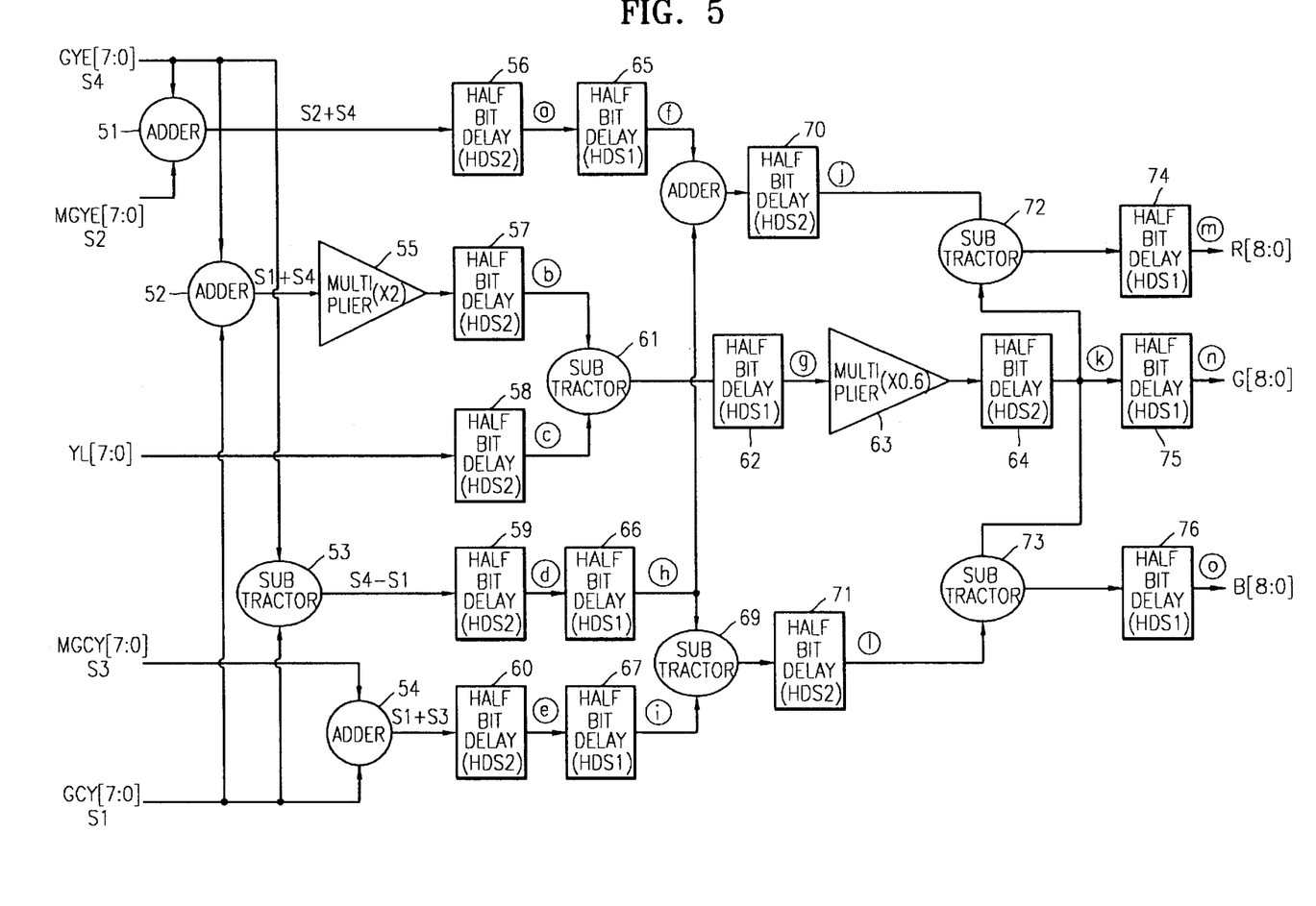
FIG. 5 is a detailed block diagram of the color signal generating block in the color signal separating circuit of FIG. 3.

FIG. 5 is a detailed block diagram of the color signal generating block in the color signal separating circuit of FIG. 3.

Referring to FIG. 5, input signals for the color signal generating block are the first through fifth output signals GCY[7:0], MGYE[7:0], YL[7:0], MGCY[7:0], and GYE [7:0] received from the CCD output synchronizing block. The color signal generating block includes fourth through seventh adders 51, 52, 54, and 68, first through fifth subtractors 53, 61, 69, 72, and 73, first and second multipliers 55 and 63, fourth through eighth, tenth, and fourteenth and fifteenth half bit delays (HDS2) 56–60, 64, 70, and 71, ninth, eleventh through thirteenth, and sixteenth through eighteenth half bit delays (HDS1) 62, 65–67, and 74–76. The fourth adder 51 adds the fifth and second output signals GYE[7:0] and MGYE[7:0] to produce an S2+S4 signal needed for the given algorithm. The fifth adder 52 adds the first and fifth output signals GCY[7:0] and GYE[7:0] to produce an S1+S4 signal. The first subtractor 53 subtracts the first output signal GCY[7:0] from the fifth output signal GYE[7:0] to produce an S4−S1 signal. The sixth adder 54 adds the first and fourth output signals GCY[7:0] and MGCY[7:0] to produce an S1+S3 signal. The first multiplier 55 multiplies the output of the fifth adder 52 by 2 to produce a $2_H$(S1−S4) signal. The fourth through eighth half bit delays (HDS2) 56–60 stabilize the output of the fourth adder 51, the output of the first multiplier 55, the third output signal YL[7:0], the output of the first subtractor 53, and the output of the sixth adder 54, respectively. The half bit delays simultaneously synchronize the above signals with a negative edge of the second basic clock signal SCLK2. The second subtractor 61 subtracts the output of the sixth half bit delay 58 from the output of the fifth half bit delay 57 to operate G=$2_H$(S1+S4)−YL[7:0]. The ninth half bit delay (HDS1) 62 stabilizes the output of the second subtractor 61 and simultaneously synchronizes it with a positive edge of the first basic clock signal SCLK1. The second multiplier 63 multiplies the output of the ninth half bit delay 62 by a 0.6-fold gain to make a 3G signal out of a 4G signal. The tenth half bit delay (HDS2) 64 stabilizes the output of the second multiplier 63 and simultaneously synchronizes it with a negative edge of the second basic clock signal SCLK2. The eleventh through thirteenth half bit delays (HDS1) 65, 66, and 67 delay the outputs of the fourth, seventh, and eighth half bit delays (HDS2) 56, 59, and 60. The seventh adder 68 adds the outputs of the eleventh and twelfth half bit delays 65 and 66 to produce (S2+S4)+(S4−S1). The third subtractor 69 subtracts the output of the twelfth half bit delay 66 from the output of the thirteenth half bit delay 67 to produce (S1+S3)−(S4−S1). The fourteenth and fifteenth half bit delays (HDS2) 70 and 71 stabilize the outputs of the seventh adder 68 and the third subtractor 69, respectively, and simultaneously synchronize the above signals with a negative edge of the second basic clock signal SCLK2, respectively. The fourth subtractor 72 subtracts the output of the tenth half bit delay 64 from the output of the fourteenth half bit delay 70 to produce [(S2+S4)−3G+(S4−S1)]. The fifth subtractor 73 subtracts the output of the tenth half bit delay 64 from the output of the fifteenth half bit delay 71 to produce [(S1+S3)−3G−(S4−S1)]. The sixteenth through eighteenth half bit delays (HDS1) 74, 75, and 76 stabilize the outputs of the fourth subtractor 72, the tenth half bit delay 64, and the fifth subtractor 73, respectively, and simultaneously synchronize the stabilized result with a positive edge of the first basic clock signal SCLK1, thereby producing the red, green, and blue color signals R[8:0], G[8:0], and B[8:0].

Figure 6:
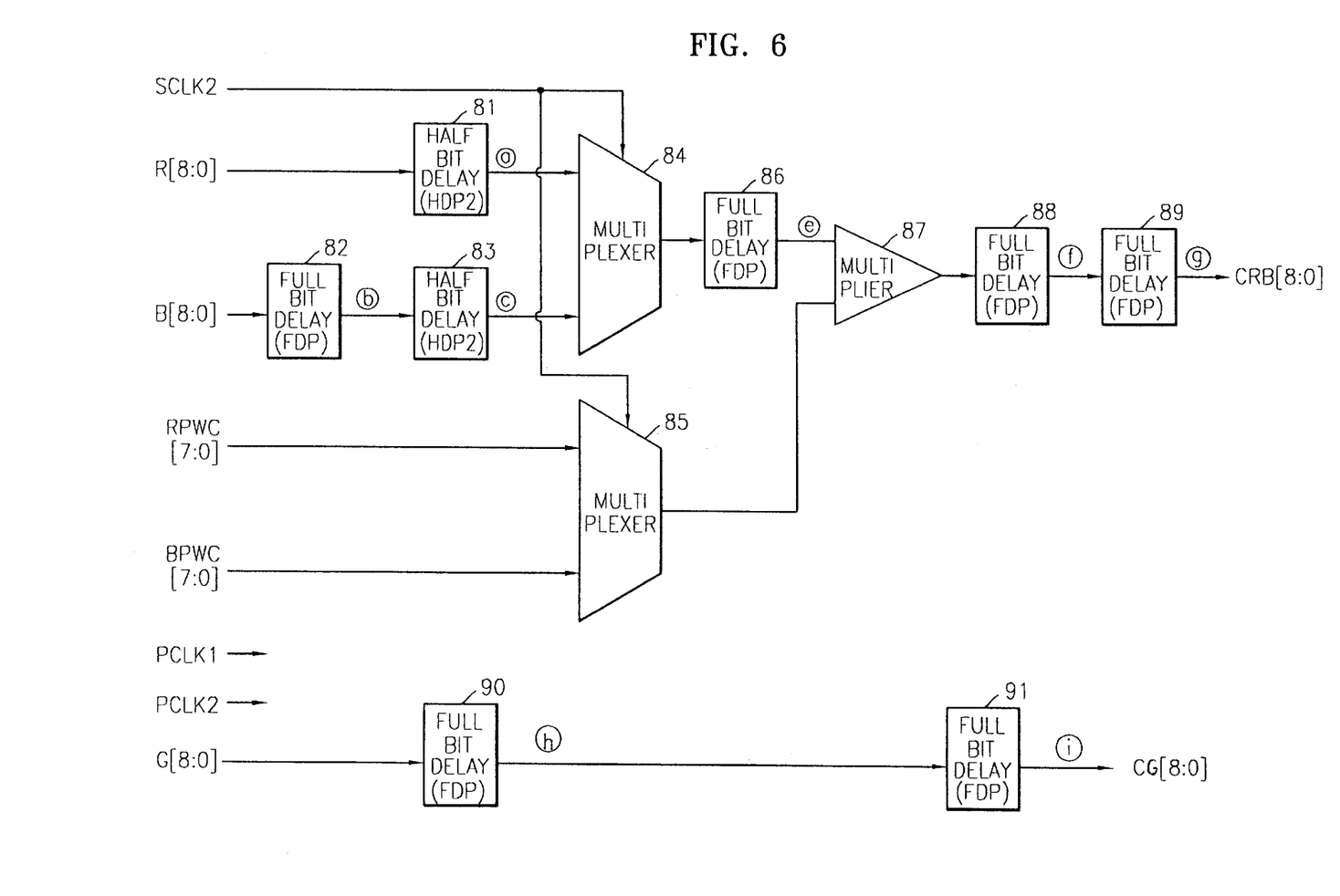
FIG. 6 is a detailed block diagram of the pre-white balance controlling block in the color signal separating circuit of FIG. 3.

FIG. 6 is a detailed block diagram of the pre-white balance controlling block in the color signal separating circuit of FIG. 3.

Referring to FIG. 6, the gain values of the red and blue color signals R[8:0] and B[8:0] should be controlled to produce the intended 1:1:1 signal since the red, green, and blue color signals R[8:0], G[8:0], and B[8:0] generated in the color signal generating block of FIG. 5 are input as 4R, 3G, and 4B, respectively. For this purpose, the red color signal R[8:0] is supplied at negative edges of the first and second basic clock signals SCLK1 and SCLK2, and the blue color signal B[8:0] is supplied at positive edges so that a full operation is executed by a single multiplier. The pre-white balance controlling block includes nineteenth and twentieth half bit delays 81 and 83, fifth through tenth full bit delays (FDP) 82, 86, 88, 89, 90, and 91, third and fourth multiplexers 84 and 85, and a third multiplier 87.

The nineteenth half bit delay (HDP2) 81 synchronizes the red signal R[8:0] with a negative edge of the fourth basic clock signal PCLK2. The fifth full bit delay (FDP) 82 delays the blue signal B[8:0] by the full bit period of the third and fourth basic clock signals PCLK1 and PCLK2. The twentieth half bit delay (HDP2) 83 delays the output of the fifth full bit delay (FDP) 82 by a half clock. The third multiplexer 84 selects one of the outputs of the nineteenth and twentieth half bit delays 81 and 83 in response to the second basic clock signal SCLK2. The fourth multiplexer 85 selects one of the first and second coefficient inputs RPWC[7:0] and BPWC[7:0] in response to the second basic clock signal SCLK2. The sixth full bit delay (FDP) 86 stabilizes the output of the third multiplexer 84 and simultaneously synchronizes it with positive edges of the third and fourth basic clock signals PCLK1 and PCLK2. The third multiplexer 87 receives the outputs of the sixth full bit delay 86 and the fourth multiplier 85, and controls the gains of the red and blue signals R[8:0] and B[8:0]. The seventh full bit delay (FDP) 88 stabilizes the output of the third multiplier 87 and synchronizes it with the third and fourth basic clock signals PCLK1 and PCLK2. The eight full bit delay (FDP) 89 synchronizes the output of the seventh full bit delay 88 with the third and fourth basic clock signals PCLK1 and PCLK2 to thereby generate the final output signal CRB[8:0]. The ninth and tenth full bit delays (FDS) 90 and 91 synchronize the green signal G[8:0] with the first and second basic clock signals SCLK1 and SCLK2 to compensate a delay time needed for controlling the gains of the red and blue signals R[8:0] and B[8:0] to the green signal G[8:0].

Figure 7:
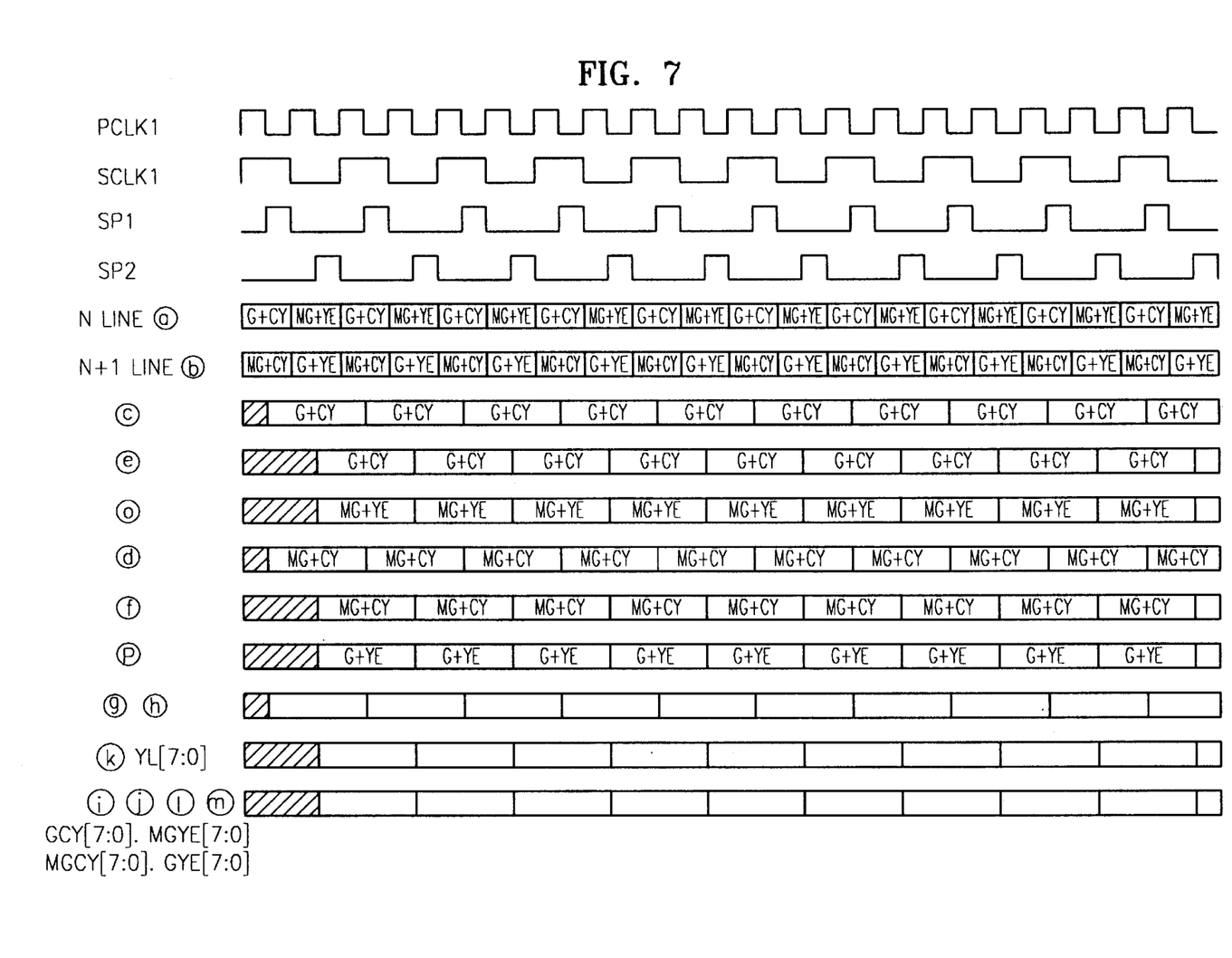
FIG. 7 is a timing diagram of signals of the CCD output synchronizing block shown in FIG. 4.
Figure 8:
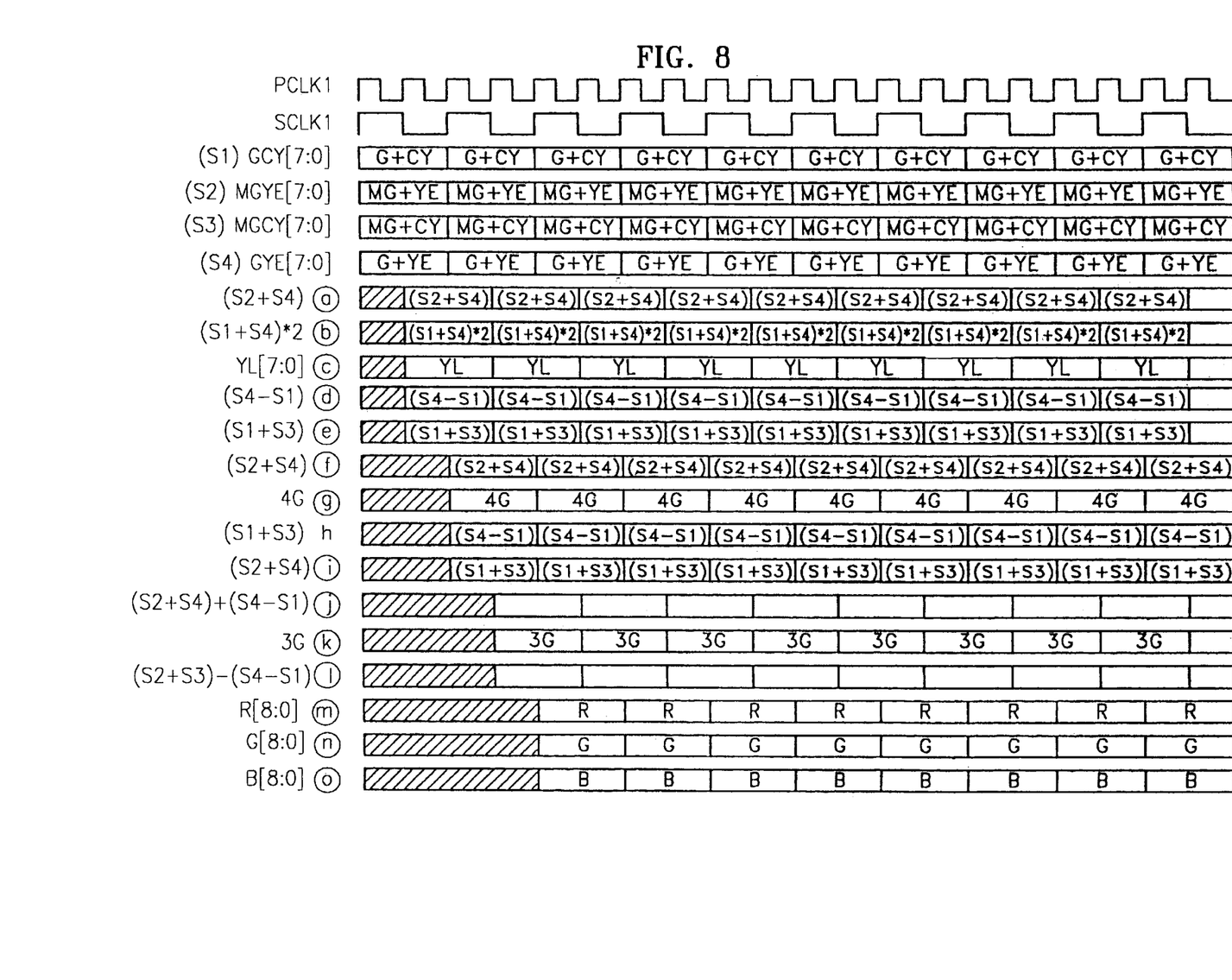
FIG. 8 is a timing diagram of signals of the color signal generating block shown in FIG. 5.
Figure 9:
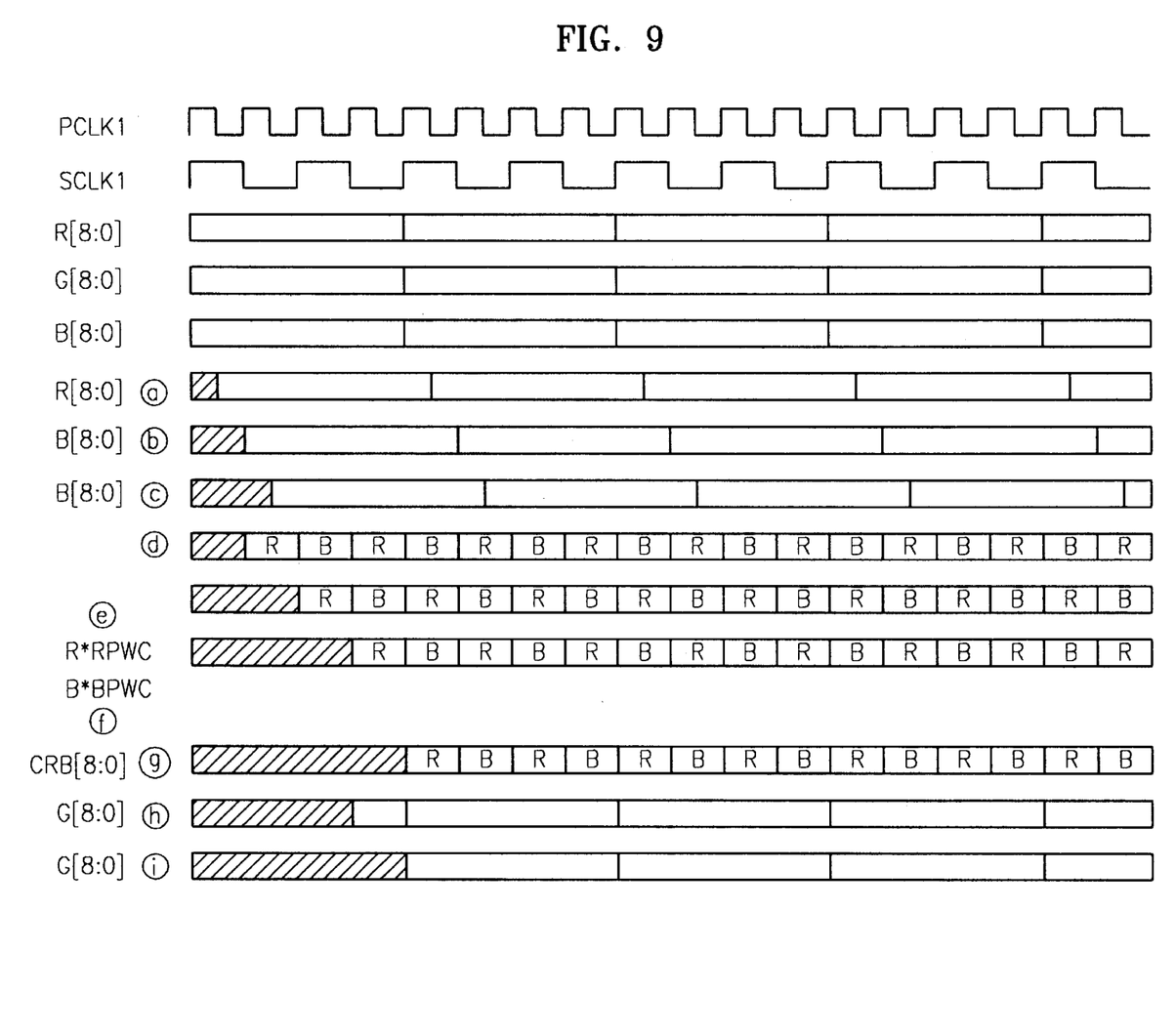
FIG. 9 is a timing diagram of signals of the pre-white balance controlling block shown in FIG. 6.

The hardware of FIGS. 3 through 6 is an exemplary embodiment implemented from the method of the present invention in hardware. However, the algorithm of the present invention can be implemented in many ways in an analog signal processing method as well as a digital signal processing method. FIG. 7 is a timing diagram of signals of the CCD output synchronizing block shown in FIG. 4. Here, reference characters (a) though (m) denote signals of respective nodes shown in FIG. 4. FIG. 8 is a timing diagram of signals of the color signal generating block shown in FIG. 5. Here, reference characters (a) through (o) denote signals of respective nodes shown in FIG. 5. In addition, FIG. 9 is a timing diagram of signals of the pre-white balance controlling block shown in FIG. 6. Reference characters (a) through (i) denote signals of respective nodes shown in FIG. 6.

Therefore, the color signal separating circuit of the present invention provides two major advantages over the prior art. First, it creates pure red, green, and blue color signals free of other color signals. Second, it increases the correlation between adjacent and non-adjacent signals of CCD pixel output on the basis of the green signal, further improving color quality.

What is claimed is:

1. A color signal separating circuit comprising:
   a CCD output synchronizing block for synchronizing first and second data input signals received from a CCD in response to first and second basic clock signals, first and second sampling clock signals, and a line selecting signal, and generating first through fifth output signals;

a color signal generating block for receiving the first through fifth output signals from the CCD output synchronizing block in response to the first and second basic clock signals, and generating red, green, and blue color signals; and a pre-white balance controlling block for receiving the red and blue color signals and first and second coefficient inputs in response to the first and second basic clock signals, and third and fourth basic clock signals, controlling the gains of the red and blue color signals, and generating a final output signal;

wherein the first data input signal is a signal passed through a single unit delay, and the size of the second data input signal is adjusted to be a half of the size of the sum of a signal avoiding the single unit delay and a signal passed through two unit delays.

2. A color signal separating circuit comprising:

a CCD output synchronizing block for synchronizing first and second data input signals received from a CCD in response to first and second basic clock signals, first and second sampling clock signals, and a line selecting signal, and generating first through fifth output signals;

a color signal generating block for receiving the first through fifth output signals from the CCD output synchronizing block in response to the first and second basic clock signals, and generating red, green, and blue color signals; and a pre-white balance controlling block for receiving the red and blue color signals and first and second coefficient inputs in response to the first and second basic clock signals, and third and fourth basic clock signals, controlling the gains of the red and blue color signals, and generating a final output signal;

wherein the period of the first and second basic clock signals is twice larger than that of the third and fourth basic clock signals.

3. A color signal separating circuit comprising:

a CCD output synchronizing block for synchronizing first and second data input signals received from a CCD in response to first and second basic clock signals, first and second sampling clock signals, and a line selecting signal, and generating first through fifth output signals;

a color signal generating block for receiving the first through fifth output signals from the CCD output synchronizing block in response to the first and second basic clock signals, and generating red, green, and blue color signals; and a pre-white balance controlling block for receiving the red and blue color signals and first and second coefficient inputs in response to the first and second basic clock signals, and third and fourth basic clock signals, controlling the gains of the red and blue color signals, and generating a final output signal;

wherein the CCD output synchronizing block comprises:

first and second multiplexers for respectively selecting one of the first and second data input signals in response to the line selecting signal to constantly keep the sequence of the first and second data input signals;

first and second sampling latches for respectively latching the outputs of the first and second multiplexers in response to the first sampling clock signal;

third and fourth sampling latches for respectively latching the outputs of the first and second sampling latches in response to the second sampling clock signal;

fifth and sixth sampling latches for respectively latching the outputs of the first and second multiplexers in response to the second sampling clock signal;

first and second adders for adding the outputs of the third and fifth sampling latches, respectively, and the outputs of the fourth and sixth latches, to obtain an averaged luminance signal for CCD pixels;

first and second gain controlling shifters for gain-controlling the levels of the output signals of the first and second adders to be the respective halves;

first and second half bit delays for synchronizing the outputs of the first and second gain controlling shifters with the second basic clock signal;

a third adder for adding the outputs of the first and second half bit delays to obtain a final average luminance value of pixels;

a third gain controlling shifter for gain-controlling the level of the output signal of the third adder to be a half;

a third half bit delay for synchronizing the output of the third gain controlling shifter with the first basic clock signal, and outputting the third output signal; and first through fourth full bit delays for synchronizing the third through sixth sampling latches and outputting the first through fifth output signals.

4. A color signal separating circuit comprising:

a CCD output synchronizing block for synchronizing first and second data input signals received from a CCD in response to first and second basic clock signals, first and second sampling clock signals, and a line selecting signal, and generating first through fifth output signals;

a color signal generating block for receiving the first through fifth output signals from the CCD output synchronizing block in response to the first and second basic clock signals, and generating red, green, and blue color signals; and a pre-white balance controlling block for receiving the red and blue color signals and first and second coefficient inputs in response to the first and second basic clock signals, and third and fourth basic clock signals, controlling the gains of the red and blue color signals, and generating a final output signal;

wherein the color signal generating block comprises:

a fourth adder for adding the second and fifth output signals of the CCD output synchronizing block;

a fifth adder for adding the first and fifth output signals of the CCD output synchronizing block;

a first subtractor for subtracting the first output signal from the fifth output signal;

a sixth adder for adding the first and fourth output signals;

a first multiplier for multiplying the output of the fifth adder by 2 in a shifting way;

fourth through eighth half bit delays for stabilizing the output of the fourth adder, the output of the first multiplier, the third output signal, the output of the first subtractor, and the output of the sixth adder, and respectively synchronizing the signals with a negative edge of the second basic clock signal;

a second subtractor for subtracting the output of the sixth half bit delay from the output of the fifth half bit delay;

a ninth half bit delay for stabilizing the output of the second subtractor and simultaneously synchronizing the output of the second subtractor with a positive edge of the first basic clock;
a second multiplier for multiplying the output of the ninth half bit delay by a 0.6-fold gain;
a tenth half bit delay for stabilizing the output of the second multiplier and simultaneously the stabilized output with a negative edge of the second basic clock;
eleventh through thirteenth half bit delays for respectively delaying the outputs of the fourth, seventh, and eighth half bit delays;
a seventh adder for adding the outputs of the eleventh and twelfth half bit delays;
a third subtractor for subtracting the output of the twelfth half bit delay from the output of the thirteenth half bit delay;
fourteenth and fifteenth half bit delays for respectively stabilizing the outputs of the seventh adder and the third subtractor, and simultaneously synchronizing the outputs of the seventh adder and the third subtractor with a negative edge of the second basic clock signal;
a fourth subtractor for subtracting the output of the tenth half bit delay from the output of the fourteenth half bit delay;
a fifth subtractor for subtracting the output of the tenth half bit delay from the output of the fifteenth half bit delay;
sixteenth through eighteenth half bit delays for respectively stabilizing the output of the fourth subtractor, the tenth half bit delay, and the fifth subtractor, simultaneously synchronizing the output of the fourth subtractor, the tenth half bit delay, and the fifth subtractor with one selected positive edge of the first basic clock signal, and outputting the red, green and blue color signals.

5. A color signal separating circuit comprising:
a CCD output synchronizing block for synchronizing first and second data input signals received from a CCD in response to first and second basic clock signals, first and second sampling clock signals, and a line selecting signal, and generating first through fifth output signals;
a color signal generating block for receiving the first through fifth output signals from the CCD output synchronizing block in response to the first and second basic clock signals, and generating red, green, and blue color signals; and
a pre-white balance controlling block for receiving the red and blue color signals and first and second coefficient inputs in response to the first and second basic clock signals, and third and fourth basic clock signals, controlling the gains of the red and blue color signals, and generating a final output signal;
wherein the pre-white balance controlling block comprises:
a nineteenth half bit delay for synchronizing the red color signal with a negative edge of the fourth basic clock signal;
a fifth full bit delay for delaying the blue color signal by the full bit period of the third and fourth basic clock signals;
a twentieth half bit delay for delaying the output of the fifth half bit delay by a half clock;
a third multiplexer for selecting one of the outputs of the nineteenth and twentieth half bit delays in response to the second basic clock signal;
a fourth multiplexer for selecting one of the first and second coefficient inputs in response to the second basic clock signal;
a sixth full bit delay for synchronizing the output of the third multiplexer and simultaneously synchronizing the stabilized output with a positive edge of the third and fourth basic clock signals;
a third multiplier for receiving the outputs of the sixth full bit delay and the fourth multiplexer, and controlling the gains of the red and blue color signals;
a seventh full bit delay for stabilizing the output of the third multiplier and synchronizing the stabilized output with the third and fourth basic clock signals;
an eighth full bit delay for synchronizing the output of the seventh full bit delay with the third and fourth basic clock signals, and generating the final output signal; and
ninth and tenth full bit delays for respectively synchronizing the green color signal with the first and second basic clock signals to compensate a delay time needed for controlling the gains of the red and blue color signals to the green color signal.

6. A color signal separating circuit comprising:
a CCD output synchronizing block for synchronizing first and second data input signals received from a CCD in response to first and second basic clock signals, first and second sampling clock signals, and a line selecting signal, and generating first through fifth output signals;
a color signal generating block for receiving the first through fifth output signals from the CCD output synchronizing block in response to the first and second basic clock signals, and generating red, green, and blue color signals; and
a pre-white balance controlling block for receiving the red and blue color signals and first and second coefficient inputs in response to the first and second basic clock signals, and third and fourth basic clock signals, controlling the gains of the red and blue color signals, and generating a final output signal;
wherein the CCD output synchronizing block and color signal generating block are constructed and arranged to generate the red, green, and blue color signals such that each of the color signals is free from other signal components; and
wherein the CCD output synchronizing block and color signal generating block are constructed and arranged to generate the red, green, and blue color signals according to the following algorithm:
Red=(S2+S4)−3G+(S4−S1)
Green=(S1+S4)−YL
Blue=(S1+S3)−3G−(S4−S1)
wherein:
MG=R+B;
YE=R+G;
CY=B+G;
G=G;
S1=G+CY=2G+B;
S2=MG+YE=2R+B+G;
S3=MG+CY=2B+R+G;
S4=G+YE=2G+R; and
YL is a luminance signal.

7. The color signal separating circuit of claim 6, wherein the CCD output synchronizing block and color signal generating block are constructed and arranged to generate the luminance signal (YL) according to the following algorithm:
YL=$0.5_H$odd number(S1+S2)+$0.5_H$even number(S1+S2).

8. A method for generating red, green, and blue color signals responsive to first and second data input signals received from a CCD, the method comprising:

generating first, second, third and fourth output signals and a luminance signal responsive to the first and second data signals; and generating the red, green, and blue color signals responsive to the first, second, third and fourth output signals and the luminance signal such that each of the color signals is free from other signal components;

wherein generating the red, green, and blue color signals comprises generating the red, green, and blue color signals according to the following algorithm:

Red=(S2+S4)−3G+(S4−S1)
Green=(S1+S4)−YL
Blue=(S1+S3)−3G−(S4−S1)

wherein:
  MG=R+B;
  YE=R+G;
  CY=B+G;
  G=G;
  S1=G+CY=2G+B;
  S2=MG+YE=2R+B+G;
  S3=MG+CY=2B+R+G;
  S4=G+YE=2G+R; and
  YL is a luminance signal.

9. The method of claim 8 wherein generating the luminance signal comprises generating the luminance signal (YL) according to the following algorithm:

YL=0.5$_H$odd number(S1+S2)+0.5$_H$even number(S1+S2).

10. A method for generating red, green, and blue color signals responsive to first and second data input signals received from a CCD, the method comprising:

generating first, second, third and fourth output signals and a luminance signal responsive to the first and second data signals; and generating the red, green, and blue color signals responsive to the first, second, third and fourth output signals and the luminance signal such that each of the color signals is free from other signal components;

wherein generating the red, green, and blue color signals comprises generating the red, green, and blue color signals according to the following arithmetic:

Red=(S2+S4)−3G+(S4−S1)
Green=(S1+S4)−YL
Blue=(S1+S3)−3G−(S4−S1)

wherein:

S1, S2, S3 and S4 are the first, second, third and fourth output signals and YL is the luminance signal.

11. A method according to claim 10 wherein generating the red, green, and blue color signals comprises generating the red, green, and blue color signals without using matrix multiplication.

* * * * *

UNITED STATES PATENT AND TRADEMARK OFFICE
CERTIFICATE OF CORRECTION

PATENT NO. : 6,519,001 B1
DATED : February 11, 2003
INVENTOR(S) : Lee

It is certified that error appears in the above-identified patent and that said Letters Patent is hereby corrected as shown below:

<u>Column 2,</u>
Line 38, "$R + G + B + G + G + R + G$" should read
-- $(R + B + R + G + G + B + G)$ --.
Line 54, " $\quad = 2R - G + 0.24R + 0.36G + 0.24B$
    $Green = YL - CR(CR = CCR - CCB,$ here)"
should read
-- $\quad = 2R - G + 0.24R + 0.36G + 0.24B$
    $\quad = 2R - 0.64G + 0.24B$
$Green = YL - CR(CR = CCR - CCB,$ here) --.

<u>Column 5,</u>
Line 13, "$Blue = (S1 + S3) - 3G + (S4 - S1)$" should read
-- $Blue = (S1 + S3) - 3G - (S4 - S1)$ --.

Signed and Sealed this

Thirteenth Day of April, 2004

JON W. DUDAS
*Acting Director of the United States Patent and Trademark Office*